(No Model.) 2 Sheets—Sheet 1.

H. STOLLWERCK.
APPARATUS FOR ROASTING COFFEE.

No. 423,458. Patented Mar. 18, 1890.

WITNESSES:

INVENTOR
Heinrich Stollwerck
BY
ATTORNEYS.

(No Model.) 2 Sheets—Sheet 2.

H. STOLLWERCK.
APPARATUS FOR ROASTING COFFEE.

No. 423,458. Patented Mar. 18, 1890.

WITNESSES:
Gustave Dieterich
Theo. F. Bourne

INVENTOR
Heinrich Stollwerck
BY Briesen, Steele & Knauth
ATTORNEYS.

UNITED STATES PATENT OFFICE.

HEINRICH STOLLWERCK, OF COLOGNE, PRUSSIA, GERMANY, ASSIGNOR TO SCHILLING, STOLLWERCK & CO., OF NEW YORK, N. Y.

APPARATUS FOR ROASTING COFFEE.

SPECIFICATION forming part of Letters Patent No. 423,458, dated March 18, 1890.

Application filed March 13, 1889. Serial No. 303,177. (No model.)

*To all whom it may concern:*

Be it known that I, HEINRICH STOLLWERCK, of Cologne, in the Kingdom of Prussia and German Empire, have invented a certain new and useful Improvement in Apparatus for the Roasting of Coffee, Cocoa, and similar Products, of which the following is a specification.

The object of my invention is to improve the construction of apparatus for roasting coffee, cocoa-beans, and the like; and the invention consists in the novel details of improvement and the combinations of parts, that will be more fully hereinafter set forth, and then specifically pointed out in the claims.

Reference is to be had to the accompanying drawings, forming part of this specification, in which—

Figure 1:
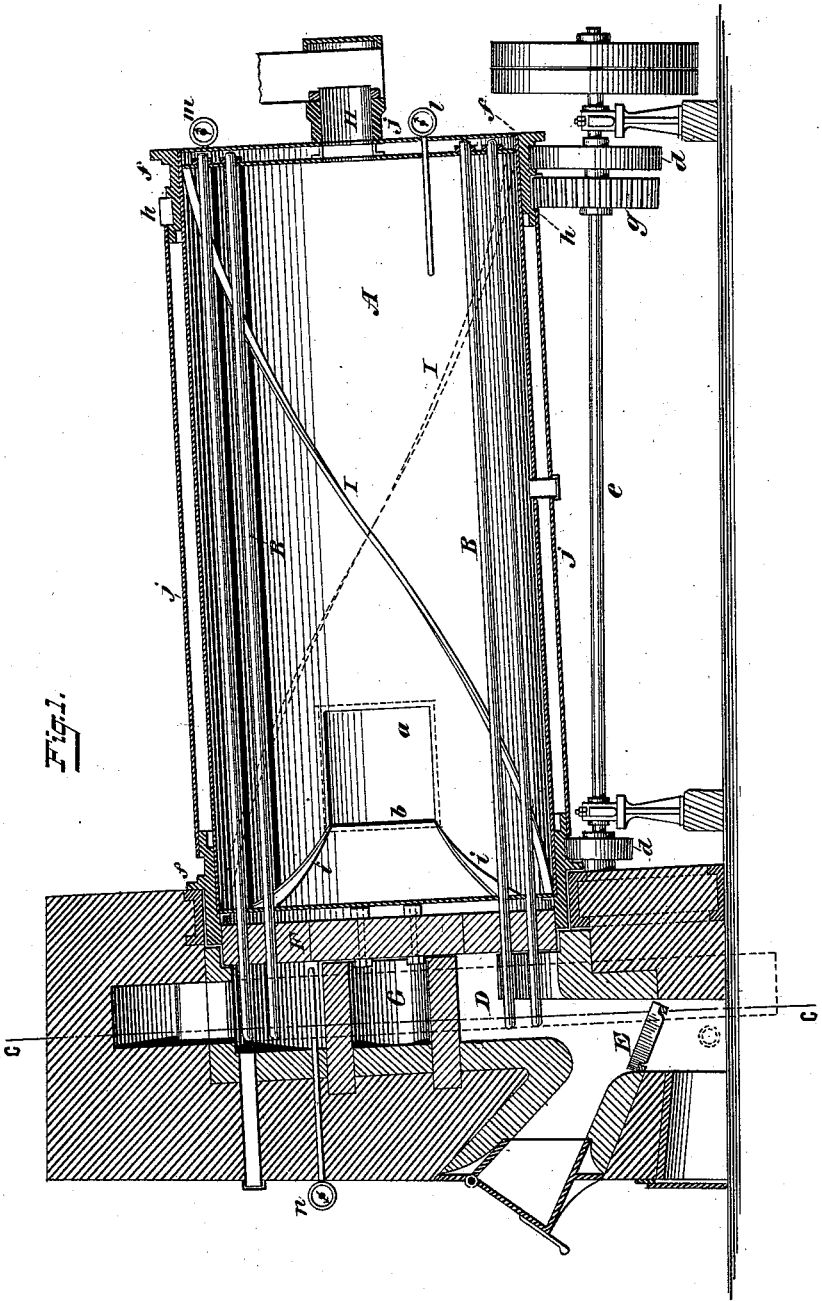
Figure 2:
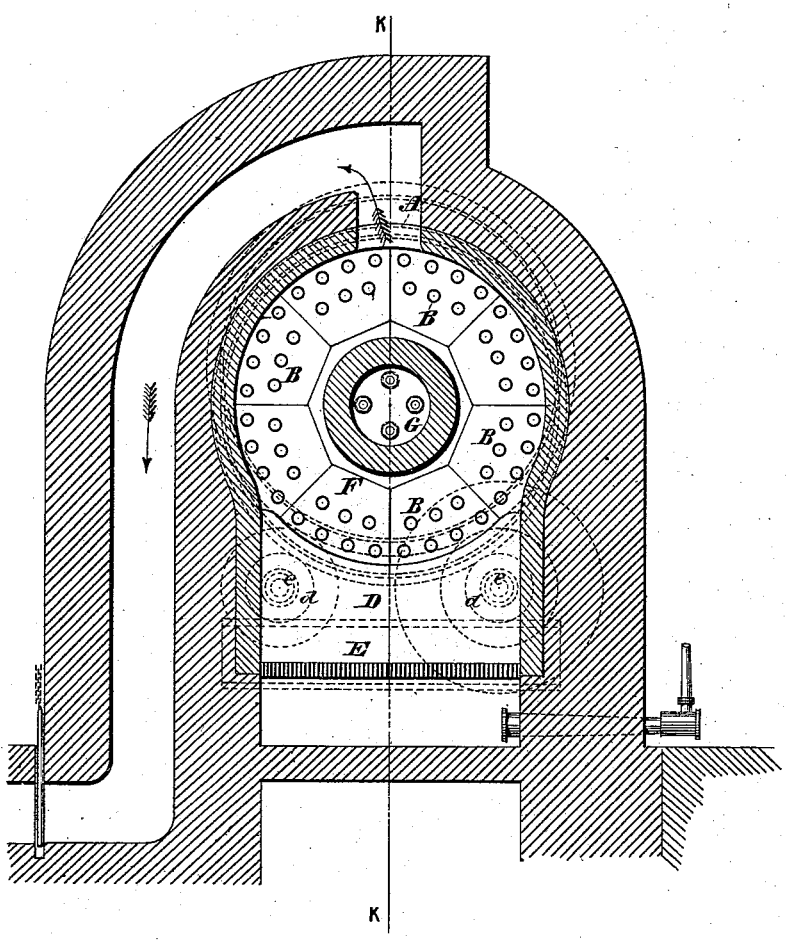

Figure 1 is a vertical longitudinal section on the plane of the line $k\,k$, Fig. 2, of a coffee-roasting apparatus constructed according to my invention; and Fig. 2 is a vertical cross-section of the same on the plane of the line $c\,c$, Fig. 1.

In the accompanying drawings, the letter A represents a cylinder or drum of suitable dimensions, which is provided with an opening $a$ for the admission and discharge of coffee, cocoa, or the like to be roasted within said cylinder. The opening $a$ is to be well closed by a suitable door $b$. The cylinder A is or may be adapted to rotate on its longitudinal axis, and it is preferably supported upon rollers $d$, that are carried by a horizontal shaft $e$, that is journaled in suitable bearings. The rollers $d$ contact a suitable thread or bearing $f$ at each end of the cylinder A, whereby the cylinder is supported in an efficient manner. A gear-wheel $g$ on the shaft $e$ engages cog-teeth $h$ on the periphery of the cylinder A, whereby as the wheel $g$ is rotated the cylinder A will also be rotated. The shaft $e$ is preferably provided with fast and loose pulleys, which receive a belt from a suitable source of power; but the cylinder A could be supported and rotated in any other suitable manner. With the cylinder A are properly secured a series of closed tubes B, that extend through and project beyond one end F of the cylinder into a combustion-chamber D of a suitable furnace. These tubes are filled with water, glycerine, or other fluid, which is heated by the tubes projecting into the combustion-chamber D. The combustion-chamber D, above the grate E, is provided with a cylinder or partition G, which divides the flame and makes it reach all the tubes B.

The interior of the cylinder A communicates with a pipe or other outlet H, whereby the vapors and aromas from the roasting coffee may be carried off and conducted to any suitable receptacle or otherwise disposed of.

I are inwardly-projecting ribs or flanges that extend along the inner wall of the cylinder A, preferably in a curved or spiral direction, which ribs serve to agitate the beans or berries in the cylinder during rotation. $i$ are similar ribs arranged at the end of the cylinder near the opening $a$, which ribs serve to collect the berries at the end of the cylinder and cause them to pass to the opening $a$, so that they may readily escape from the cylinder when it is desired to empty the same.

When roasting the coffee or other berries in the cylinder A, the ends of the closed tubes B within the combustion-chamber D become heated, and thereby heat the water in the tubes, which heats the interior of the cylinder A. The berries during the rotation of the cylinder are roasted by the heat thus produced. The same principle of invention is applicable when the cylinder A is stationary and the tubes B B are revolved, and also when said tubes remain stationary within a rotating cylinder.

In order to retain the heat in the cylinder A as much as possible, I prefer to place a jacket $j$ around the cylinder, and also a similar jacket $j$ at the end thereof to prevent the radiation of heat.

In order to indicate the temperature within the cylinder A, I connect with said cylinder a suitable thermometer $l$, and for indicating the pressure a manometer $m$ is connected with the cylinder A, and in order to indicate the temperature in the combustion-chamber D, I may connect therewith a thermometer or similar instrument $n$, all as clearly shown in Fig. 1.

It is known that a steam-pressure of from eighty to one hundred atmospheres in a closed pipe is equal to 290° to 308° centigrade, which equals 522° to 555° Fahrenheit, and in like ratio a pressure of from thirty-four to one hundred and seventy-five atmospheres may be utilized, representing from 240° to 350° centigrade.

Having now described my invention, what I claim is—

1. In an apparatus for roasting coffee, cocoa, and the like, the combination of the cylinder A with a series of closed tubes B partially within said cylinder, said tubes being carried by said cylinder near its walls and rotated with said cylinder, the ends of said tubes projecting beyond said cylinder, and with the combustion-chamber of a furnace into which said tubes project, substantially as described.

2. The cylinder A, combined with the closed tubes B, that are partially contained within said cylinder and that project beyond the same, said tubes being carried by said cylinder near its walls and rotated with said cylinder, said tubes containing a heating-fluid, and with the combustion-chamber of a furnace into which said tubes extend, said tubes being arranged to contact the berries in the cylinder, substantially as described.

3. The furnace D, having flame-divider G, combined with the closed pipes B B and cylinder A, said pipes B reaching into said furnace and also into said cylinder A, as specified.

4. The revolving cylinder A, having internal rib I, for agitating berries, combined with the closed tubes B, passing through said cylinder and projecting from the end thereof, said tubes being near the circumference of the cylinder and in position to be struck by the berries in the cylinder, and with the combustion-chamber of a furnace into which said tubes project, and means, substantially as described, for admitting berries to the cylinder and for carrying off the vapors, all arranged for operation substantially as herein shown and described.

In testimony whereof I have signed my name to this specification in the presence of two subscribing witnesses.

HEINR. STOLLWERCK.

Witnesses:
GUSTAVE ALBERT OELRICHS,
ED. MANNERT.